United States Patent
O'Dea et al.

(10) Patent No.: US 9,285,485 B2
(45) Date of Patent: Mar. 15, 2016

(54) GPS-ENHANCED VEHICLE VELOCITY ESTIMATION

(75) Inventors: Kevin A. O'Dea, Ann Arbor, MI (US); Jihan Ryu, Rochester Hills, MI (US); Flavio Nardi, Farmington Hills, MI (US); Hualin Tan, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1784 days.

(21) Appl. No.: 12/616,933

(22) Filed: Nov. 12, 2009

(65) Prior Publication Data

US 2011/0112739 A1    May 12, 2011

(51) Int. Cl.
G05D 1/02 (2006.01)
G01S 19/52 (2010.01)
G01C 21/16 (2006.01)

(52) U.S. Cl.
CPC .............. *G01S 19/52* (2013.01); *G01C 21/165* (2013.01)

(58) Field of Classification Search
USPC .............. 701/70, 1, 23, 41, 472, 71; 318/587; 340/429, 440
See application file for complete search history.

(56) References Cited

U.S. PATENT DOCUMENTS

| | | | |
|---|---|---|---|
| 5,815,825 A * | 9/1998 | Tachibana | G05D 1/024 180/169 |
| 6,671,587 B2 | 12/2003 | Hrovat et al. | |
| 6,847,875 B2 | 1/2005 | Lu et al. | |
| 6,915,193 B2 | 7/2005 | Lu et al. | |
| 2005/0251328 A1* | 11/2005 | Merwe | G01S 19/49 701/472 |
| 2007/0067085 A1* | 3/2007 | Lu | B60T 8/172 701/70 |
| 2008/0319611 A1* | 12/2008 | Song | B60T 8/172 701/41 |
| 2009/0299546 A1* | 12/2009 | Hac | B60G 17/0162 701/1 |

OTHER PUBLICATIONS

Study on Influence of Slideship Angle and Yaw Rate on Vehicle Stability, vol. 22, No. 2, Journal of Hubei Automotive Industries Institute, Jun. 2008.

* cited by examiner

*Primary Examiner* — Adam Tissot

(57) ABSTRACT

A method is provided for estimating vehicle velocity for a vehicle using a single-antenna global positioning system (GPS). An absolute speed and a course angle of the vehicle is measured using the single-antenna GPS. The yaw rates of the vehicle are measured independently of the GPS. An integrated yaw rate of the vehicle is calculated as a function of the measured yaw rates over a period of time. A yaw angle is determined as a function of a reference yaw angle and the integrated yaw rate. A side slip angle is calculated as a function of the estimated yaw angle and the course angle provided by the GPS. The vehicle velocity is determined as a function of the absolute speed and the side slip angle. The vehicle velocity is provided to a vehicle dynamic control application.

20 Claims, 2 Drawing Sheets

GPS-ENHANCED VEHICLE VELOCITY ESTIMATION

BACKGROUND OF INVENTION

An embodiment relates generally to vehicle velocity estimation.

Various vehicle safety and control systems benefit when utilizing an accurate longitudinal and/or lateral vehicle velocity. Devices for accurately measuring longitudinal and lateral velocity measurements, such as multi-antenna GPS or optical sensors, are either too expensive or externally intrusive. The use of other types of sensors to measure longitudinal and lateral velocity, such as wheel speed sensors or even lateral acceleration sensors, have difficulties in providing accurate measurements when excessive wheel slip is present or when a banked road is present.

SUMMARY OF INVENTION

An advantage of an embodiment is estimation of vehicle longitudinal and lateral velocities using single-antenna GPS data which provides greater accuracy than typical sensors utilized on vehicles. The GPS measurement data provides greater accuracy of the course heading angle and absolute speed which is used to estimate the longitudinal and lateral velocities. Use of a single-antenna GPS reduces cost as opposed to a multi-antenna GPS and eliminates the requirement of expensive and high quality sensors when accurate velocity data is required. Moreover, vehicle dynamic applications benefit from having accurate data for controlling vehicle dynamic operations of the vehicle.

An embodiment contemplates a method for estimating vehicle velocity for a vehicle using a single-antenna global positioning system (GPS). An absolute speed and a course angle of the vehicle are measured using the single-antenna GPS. The yaw rates of the vehicle are measured independently of the GPS. An integrated yaw rate of the vehicle is calculated as a function of the measured yaw rates over a period of time. A yaw angle is determined as a function of a reference yaw angle and the integrated yaw rate. A side slip angle is calculated as a function of the estimated yaw angle and the course angle provided by the GPS. The vehicle velocity is determined as a function of the absolute speed and the side slip angle. The vehicle velocity is provided to a vehicle dynamic control application.

An embodiment contemplates a system for determining a vehicle velocity for a vehicle. A single-antenna global positioning system (GPS) provides an absolute speed and a course angle of the vehicle. Vehicle sensors provide yaw rate measurements independent of the GPS. A processor calculates an integrated yaw rate, a yaw angle, a side slip angle, and a vehicle velocity. Integrated yaw rate of the vehicle is determined as a function of the measured yaw rates over a period of time. The yaw angle is determined as a function of a reference yaw angle and the integrated yaw rate. The side slip angle is determined as a function of the estimated yaw angle and the course angle provided by the GPS. The vehicle velocity is determined as a function of the absolute speed and the side slip angle. The vehicle velocity is provided to a vehicle dynamic control application.

DETAILED DESCRIPTION

Figure 1:
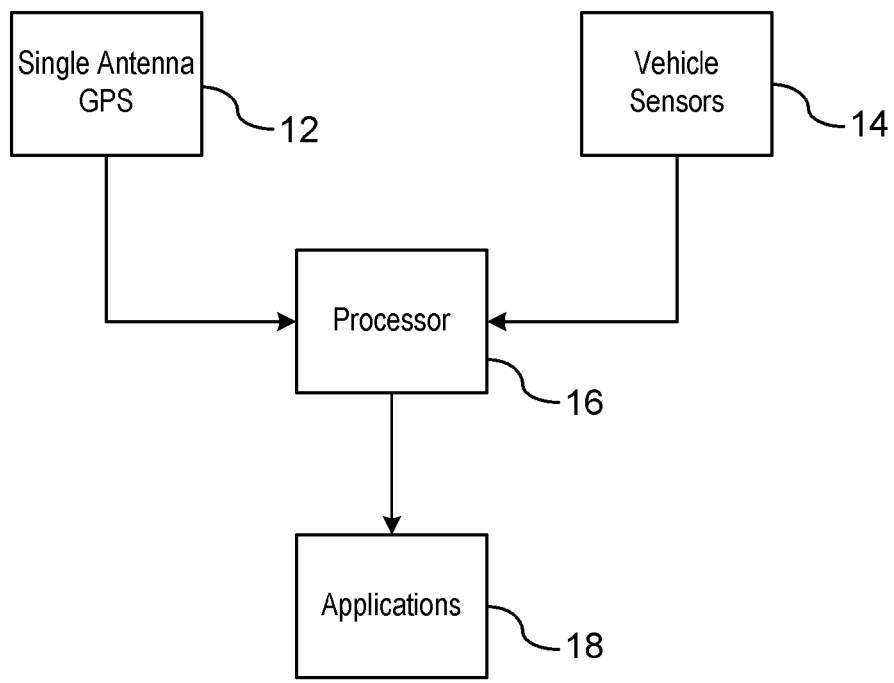
FIG. 1 is a vehicle velocity estimation system for a vehicle.

There is shown in FIG. 1 a system 10 for determining a longitudinal velocity and a lateral velocity of a vehicle. The system includes a single antenna global positioning system (GPS) 12, and at least one sensor 14 that includes, but is not limited to, a yaw rate sensor, accelerometer, and velocity sensor. The system 10 further includes a processor 16 for processing the data received from the single antenna GPS 12 and the at least one sensor 14. The processor 16 determines a longitudinal velocity and a lateral velocity based on the data received by the single antenna GPS 12 and the at least one sensor 14. The longitudinal velocity and lateral velocity obtained from the processor 16 are provided to various vehicle safety and control systems which benefit from knowing an accurate vehicle longitudinal velocity and lateral velocity.

The single antenna GPS 12 utilizes only one antenna. GPS typically provides a very good velocity measurement that includes a velocity direction (i.e., course heading) and magnitude (i.e., absolute speed). For example, GPS velocity is significantly more accurate than the position data provided by a GPS, with errors on the order of 3 cm/s (1σ, horizontal velocity) and 6 cm/s (vertical velocity) without any differential corrections. Multi-antenna GPS, which has more than two GPS antennas, also provides accurate yaw angles. A sideslip angle β can be determined by the course heading and yaw angle which is used to determine the lateral and longitudinal velocities.

Figure 2:
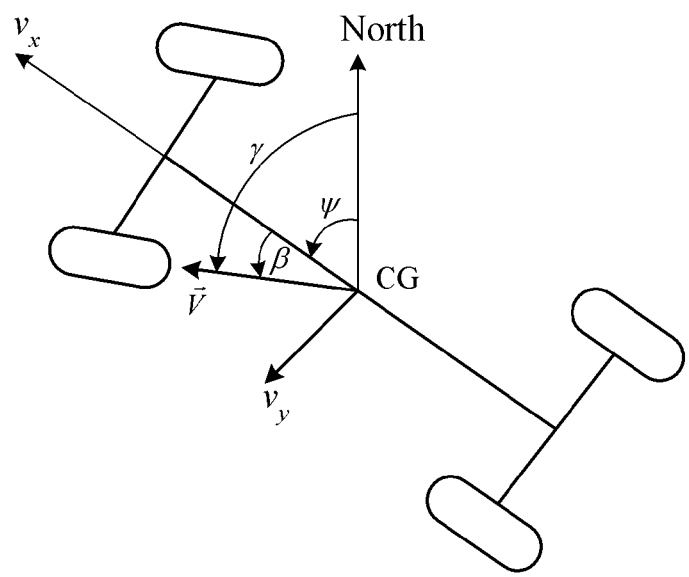
FIG. 2 is an illustration of a velocity vector model of a vehicle.

FIG. 2 illustrates a velocity vector model of a vehicle. Given a longitudinal velocity $v_x$ and a lateral velocity $v_y$ at any point on the vehicle, the sideslip angle β can be determined. The sideslip angle is defined by the following equation:

$$\beta = \tan^{-1}\left(\frac{v_y}{v_x}\right). \tag{1}$$

The sideslip angle β at a center of gravity (CG) is shown in FIG. 2. If the longitudinal and lateral velocities are not known, the sideslip angle β can be expressed by the following equation:

$$\beta = \gamma - \psi \tag{2}$$

where β is a sideslip angle, γ is a velocity direction (i.e., course heading angle) of the vehicle, and ψ is the yaw angle of the vehicle.

Once the sideslip angle β is determined and the absolute speed $\|V\|$ (i.e., the magnitude of the velocity vector of the vehicle) is obtained by the single-antenna GPS, the longitudinal velocity $v_x$ and the lateral velocity $v_y$ can be obtained by the following equations:

$$v_x = \|V\|\cos(\beta) \tag{3}$$

$$v_y = \|V\|\sin(\beta). \tag{4}$$

A single-antenna GPS provides a direct measurement of the velocity vector γ and the absolute speed $\|V\|$; however, a single-antenna GPS does not provide a direct measurement of the vehicle yaw angle ψ. While a multi-antenna GPS provides altitude measurements, such as yaw, pitch, and roll, the single-antenna GPS is limited to providing absolute speed and course heading angle with respect to the earth in addition to a position measurement. The yaw angle ψ cannot be directly measured by the single-antenna GPS. Therefore, the yaw angle ψ must be calculated using GPS data and vehicle sensor data as opposed to a direct measurement in order to calculate the sideslip angle β.

To obtain the yaw angle ψ, yaw rate data is used in cooperation with GPS data to estimate the yaw angle ψ. The yaw angle ψ is estimated by integrating yaw rate sensor measurements over a period of time. One drawback of integrating yaw rate measurements is that pure integration over time accumulates sensor errors such as noise and bias of the sensors. This contamination of noise and bias depends entirely on the quality of a yaw rate sensor. While bias and noise level of typical yaw rate sensors may not be high, the result is that the integration of the yaw rate sensor measurements is only valid for a few tens of seconds. Integration errors due to noise and bias grow quickly as time goes forward. An example of the error of a yaw rate integration, which is not meant to be a definitive time limit, is that the error becomes larger than 0.5 degrees in about 25 seconds. Therefore, the integration process needs to be either reset and initialized or updated continuously. With a lack of an accurate yaw angle measurement, the integration process cannot be updated continuously. Therefore, the yaw rate integration must be re-initialized after a period of time.

To re-initialize the yaw angle, a determination is made that the sideslip angle β is zero when the vehicle is traveling in a straightforward direction. It is determined from eq. (2) that the yaw angle ψ is equal to the course heading γ when the sideslip angle β is zero:

$$\gamma = \psi \tag{5}$$

when $$\beta = 0. \tag{6}$$

As a result, when the vehicle is going straight, the yaw angle ψ is re-initialized to the course heading angle γ. The yaw rate is also re-initialized by purging the past yaw rate and measuring yaw rates over a next period of time. A new integrated yaw rate is determined for the next period of time and used thereafter to update the yaw angle. The equation for estimating yaw angle as function of the integrated yaw rate and re-initialized yaw angle is as follows:

$$\hat{\psi} = \int_0^t r_m \, dt + \psi_0 \tag{7}$$

where $\hat{\psi}$ is the estimated yaw angle, $r_m$ is the yaw rate sensor measurement, $\psi_0$ is the re-initialized yaw angle, and t is a duration of time in which yaw rate sensor measurements are integrated.

As a result, the side slip angle is estimated using the estimated yaw angle as determined in eq. (7) and the course heading angle γ as provided by the single-antenna GPS as indicated by the following equation:

$$\hat{\beta} = \gamma_m^{GPS} - \hat{\psi} \tag{8}$$

wherein $\hat{\beta}$ is the estimated side slip angle, $\gamma_m^{GPS}$ is the course heading angle as measured by the single-antenna GPS, and $\hat{\psi}$ is the estimated yaw angle determined by the integrated yaw rate.

In the event that the vehicle is continues traveling along a turn (i.e., non-straightforward direction) in which the side slip cannot be re-initialized to zero, then the side slip angle $\hat{\beta}$ can be estimated using the techniques described in co-pending application having a Ser. No. 12/276,965, filed on Nov. 24, 2008, which is incorporated by reference in its entirety.

Once the estimated side slip angle $\hat{\beta}$ is known, estimated longitudinal velocities and lateral velocities can be calculated as follows using the absolute speed $\|V\|$ determined by the single-antenna GPS and the estimated side slip angle $\hat{\beta}$:

$$\hat{v}_x = \|V\| \cos(\hat{\beta}) \tag{9}$$

$$\hat{v}_y = \|V\| \sin(\hat{\beta}) \tag{10}$$

An issue may still exist due to the update rate of the GPS velocity measurement when used to estimate the side slip angle, lateral velocity, and longitudinal velocity for vehicle dynamic applications. That is, vehicle dynamic applications benefit from receiving timely information and performing control actions accordingly. Some GPS receivers commonly have a 1-20 Hz update rate. Some vehicle dynamic applications, such as, but not limited to, vehicle stability control system require a faster update rate. Moreover, delays in measurements that are a result of the time required to process the signals form GPS satellites may take anywhere from tens of milliseconds to hundreds of milliseconds. This delay becomes even more significant when the GPS measurements are used with other vehicle sensor measurements such as the yaw rate sensor measurements. Due to the transmission and processing delays in the GPS system, the delayed GPS measurements and the other vehicle sensor measurements must be synchronized. The delay can be synchronized using the PPS (pulse-per second) signal from the GPS receiver. PPS is a pulse signal that has either a rising or falling edge on each second in GPS time. As a result, each GPS measurement sample has a GPS time stamp and the GPS measurements can be synchronized with other sensor measurements since there is no delay in PPS through the GPS receiver.

To synchronize the GPS measurements and other sensor measurements, the delay is first determined using the PPS signal from the GPS receiver. The sensor measurements are buffered since there is no delay with respect to processing the sensor measurements. The buffered data associated with the beginning of the delay are utilized as the starting points and the estimated lateral velocity and longitudinal velocity are summed or re-integrated up to the current timestamp using the buffered data.

To incorporate the buffered data of the delay, let k be a past time and $t_k$ as a current time step, but the data is retrieved from time k steps in the past. At time $t_k$, the following equations are based on the GPS measurement data:

$$\hat{v}_x(t) = \|V_{GPS}(k)\| \cos(\hat{\beta}(k)) \tag{11}$$

$$\hat{v}_y(t) = \|V_{GPS}(k)\| \sin s(\hat{\beta}(k)) \tag{12}$$

The goal is to find $\hat{v}_x(t)$ and $\hat{v}_y(t)$ where t represents the current time stamp. To determine $\hat{v}_x(t)$ and $\hat{v}_y(t)$ at the current time stamp t, various sensor measurements as well as calculated values obtained from the last GPS update k until the current time t are buffered. The various sensor measurements and calculated values include $a_{x,m}$, $a_{y,m}$, $\dot{\psi}$, bank angle, and grade angles. Values that are not obtained through sensor measurements may be determined using the following relationships:

$$a_{y,m} = \dot{v}_{y,estimate} + r_m \cdot v_{x,sensor} + a_{y,bias} + g \cdot \sin \phi_r + w_{ay,m} \tag{13}$$

$$a_{x,m} = \dot{v}_{x,estimate} - r_m \cdot v_{y,sensor} + a_{x,bias} + g \cdot \sin \theta_r + w_{ax,m} \tag{14}$$

where $a_{y,m}$ is a lateral accelerometer measurement, $a_{x,bias}$ is a lateral accelerometer bias, $r_m$ is a yaw rate at a sensor location, $\dot{v}_{y,estimate}$ is a lateral velocity at the center of gravity of the vehicle, $a_{y,bias}$ is the lateral acceleration bias of a sensor, g is the gravity, $\phi_r$ is the road grade, $w_{ay,m}$ is lateral accelerometer noise, $a_{x,m}$ is the longitudinal acceleration, $\dot{v}_{x,estimate}$ is the longitudinal velocity at the center of gravity of the vehicle, $a_{x,bias}$ is the longitudinal acceleration bias of the sensor, θ is the road grade, and $w_{ax,m}$ is longitudinal accelerometer noise.

For each discrete instance of time over the period of the delay (e.g., each k step), a new $\hat{v}_x(t)$ and $\hat{v}_y(t)$ is determined. The following equation represent the longitudinal velocity at a next instant of time within the delay period:

$$\hat{v}_x(t_{k+1}) = \hat{v}_x(t_k) + T_s \cdot (a_{x,m} + r_m \cdot \hat{v}_y(t_k) - g \cdot \sin\theta_r) \quad (15)$$

where $\hat{v}_x(t_{k+1})$ is the longitudinal velocity at timestamp k+1, $\hat{v}_x(t_k)$ is the longitudinal velocity at timestamp k, $T_s$ is the timestamp at a respective k, $a_{x,m}$ is the longitudinal velocity at the timestamp k, $r_m$ is the measured yaw rate, $\hat{v}_y(t_k)$ is the lateral velocity at timestamp k, g is the gravity, θ is the road grade.
The following equation represents the lateral velocity at a next time instance within the delay:

$$\hat{v}_y(t_{k+1}) = \hat{v}_y(t_k) + T_s \cdot (a_{y,m} - r_m \cdot \hat{v}_x(t_k) - g \cdot \sin\phi_r) \quad (16)$$

where $\hat{v}_y(t_{k+1})$ is the lateral velocity at timestamp k+1, $\hat{v}_y(t_k)$ is the lateral velocity at timestamp k, $T_s$ is the timestamp at a respective k, $a_{y,m}$ is the lateral velocity at the timestamp k, $r_m$ is the measured yaw rate, $\hat{v}_x(t_k)$ is the longitudinal velocity at timestamp k, g is the gravity, and $\phi_r$ is the road grade.

Since the bias and noise of the sensors are part of the measurement data, the bias and noise variables are dropped from the equation. After the longitudinal and lateral velocities are estimated for each instant of time (i.e., k steps), longitudinal and lateral vehicle velocities of the current timestamp based on the synchronization of the GPS measurements and buffered sensor measurement data are determined. The longitudinal velocity for the current timestamp is represented by the following formula:

$$\hat{v}_x(t) = \sum_{i=1}^{k} \hat{v}_x(t_i) + T_s \cdot (a_{x,i} + r_{m,i} \cdot \hat{v}_y(t_i) - g \cdot \sin\theta_{r,i}) \quad (17)$$

where $\hat{v}_x(t)$ is the longitudinal velocity at time t, $\hat{v}_x(t_i)$ is the longitudinal velocity at each timestamp i, $T_s$ is the time at each timestamp i, $a_{x,m}$ is the longitudinal acceleration at each timestamp i, $r_{m,i}$ is the measured yaw rate at time instant i, $\hat{v}_y(t_i)$ is the lateral velocity at each timestamp i, g is the gravity, and θ is the road grade at each timestamp i.

Similarly, the lateral velocity of the current timestamp may be represented by the following equation:

$$\hat{v}_y(t) = \sum_{i=1}^{k} \hat{v}_y(t_i) + T_s \cdot (a_{y,i} - r_{m,i} \cdot \hat{v}_x(t_i) - g \cdot \sin\phi_{r,i}) \quad (18)$$

where $\hat{v}_y(t)$ is the lateral velocity at time t, $\hat{v}_y(t_i)$ is the lateral velocity at each timestamp i, $T_s$ is the time at each timestamp i, $a_{y,m}$ is the lateral acceleration at each timestamp i, $r_{m,i}$ is the measured yaw rate at time instant i, $\hat{v}_x(t_i)$ is the longitudinal velocity at each timestamp i, g is the gravity, and $\phi_{r,i}$ is the road bank at each timestamp i.

The longitudinal vehicle velocity $\hat{v}_y(t)$ and lateral vehicle velocity $\hat{v}_y(t_{k+1})$ for the current time stamp obtained from eq. (17) and eq. (18) are provided to vehicle dynamic applications to determine control actions based on the current operating conditions of the vehicle.

Figure 3:
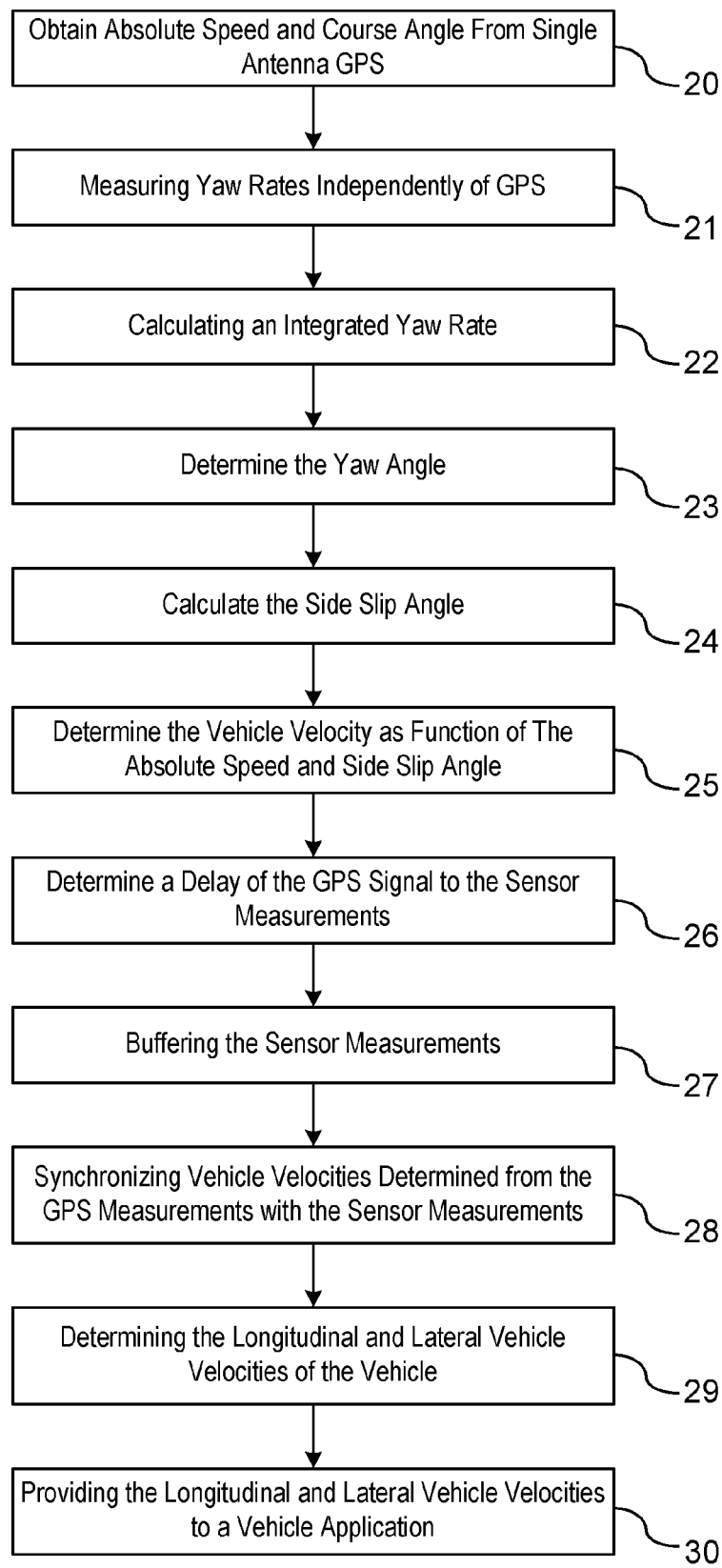
FIG. 3 is a flowchart for estimating longitudinal velocities and lateral velocities.

FIG. 3 illustrates a flow chart for determining the longitudinal and lateral velocities for a current timestamp. In step 20, the absolute speed of the vehicle and the course heading angle are retrieved from a single-antenna GPS.

In step 21, yaw rates are obtained from vehicle sensors independent of GPS. In step 22, the yaw rates measured over a period of time are integrated for determining a yaw angle.

In step 23, the yaw angle is estimated (eq. (7)) as a function of the integrated yaw rate and the current yaw angle. Errors in the sensor measurement data due to the quality of the sensor require the integrated yaw rate and the current yaw angle be re-initialized after a period of time. As discussed earlier, the yaw angle is equal to the course heading angle when the vehicle is driving in a straightforward direction. Therefore, after the period of time has expired, the system determines if the vehicle is traveling in the straightforward direction for re-initializing the yaw angle to that of the course heading angle or reinitializes the yaw angle using an estimate slip angle according to method described in co-pending application Ser. No. 12/276,965.

In step 24, the side slip angle is estimated (eq. (8)) using the estimated yaw angle determined in step 23 and the course heading angle as measured by the single-antenna GPS.

In step 25, the vehicle velocity is determined as a function of the absolute speed and the side slip angle using eq. (9) and (10). Due to the update rate and delays in processing the data in the GPS receiver, estimates must me made for a current time stamp since the data processed in eq. (9) and (10) is using past data (i.e., delayed data).

In step 26, a delay of the GPS signal in relation to the vehicle sensor measurement data is determined using the PPS in the GPS signal.

In step 27, sensor measurements data is buffered for synchronization.

In step 28, vehicle longitudinal and lateral velocities at each time instance of the delay are determined by synchronizing the GPS measurements with the vehicle sensor measurements using the equations shown in eq. (13)-(16).

In step 29, an estimated longitudinal velocity and estimated lateral velocity are determined using each of the discrete velocity calculations in eq. (15)-(16). The estimated longitudinal and lateral velocities are determined using a summation process as shown eq. (17)-(18). Alternatively, an integral function may be substituted in eq. (17)-(18) by integrating each time step due to the updates that occur to longitudinal and lateral velocity estimations after each step in time.

It should be understood that the above process is used when GPS data is present. In those instances when GPS is not available, then a next best estimation technique may be used to determine the longitudinal and lateral velocities such as those described in co-pending application Ser. No. 12/276, 965; however, the above estimation technique described herein may be re-executed when the GPS becomes available, since the use of the GPS data provides greater accuracy than vehicle sensors which are subject to errors and bias over time.

While certain embodiments of the present invention have been described in detail, those familiar with the art to which this invention relates will recognize various alternative designs and embodiments for practicing the invention as defined by the following claims.

What is claimed is:

1. A method of estimating vehicle velocity for a vehicle using a single-antenna global positioning system (GPS), the method comprising the steps of:
   measuring an absolute speed and a course heading angle of the vehicle using the single-antenna GPS;
   measuring yaw rates of the vehicle independently of the GPS;

calculating an integrated yaw rate of the vehicle as a function of the measured yaw rates over a period of time;
determining a yaw angle as a function of an initialized yaw angle and the integrated yaw rate;
calculating a side slip angle as a function of the yaw angle and the course heading angle provided by the GPS;
determining the vehicle velocity as a function of the absolute speed and the side slip angle; and
providing the vehicle velocity to a vehicle dynamic control application.

2. The method of claim 1 wherein the vehicle velocity includes a lateral velocity.

3. The method of claim 2 wherein the lateral velocity is determined by the formula:

$$\hat{v}_x = \|V_{GPS}\| \cos(\hat{\beta})$$

where $\hat{v}_x$ is the lateral velocity, $\|V_{GPS}\|$ is the absolute speed, and $\hat{\beta}$ is the side slip angle.

4. The method of claim 1 wherein the vehicle velocity includes a longitudinal velocity.

5. The method of claim 4 wherein the lateral velocity is determined by the formula:

$$\hat{v}_y = \|V_{GPS}\| \sin(\hat{\beta})$$

where $\hat{v}_y$ is the lateral velocity, $\|V_{GPS}\|$ is the absolute speed, and $\hat{\beta}$ is the side slip angle.

6. The method of claim 1 wherein the yaw angle and the integrated yaw rate are re-initialized after the period of time.

7. The method of claim 6 wherein the period of time is approximately 25 seconds.

8. The method of claim 6 wherein re-initializing the yaw angle further comprising the steps of:
detecting when vehicle is traveling in a straightforward direction; and
setting the yaw angle equal to the course angle in response to detecting the vehicle traveling in the straightforward direction.

9. The method of claim 6 wherein re-initializing the integrated yaw rate comprises the steps of:
initializing the time period to zero;
initializing the yaw rate to zero;
measuring yaw rates of a next period of time;
calculating an integrated yaw rate of the vehicle as a function of the measured yaw rates over the next period of time.

10. The method of claim 1 wherein the side slip angle is determined by the following equation:

$$\beta = \gamma_m^{GPS} - \hat{\psi}$$

where $\beta$ is the slide slip angle; $\gamma_m^{GPS}$ is the course angle as determined by the GPS, and $\hat{\psi}$ is the estimated yaw angle.

11. The method of claim 1 wherein determining the vehicle velocity further includes compensating for a delay in an update rate of the GPS measurements.

12. The method of claim 11 further comprising the steps of:
determining a delay of the GPS measurements as a result of the processing time of a received GPS signal;
buffering sensor measurements provided by vehicle sensors;
associating the sensor measurements with a timestamp;
determining a discrete vehicle velocity for each timestamp over the period of the delay, each discrete vehicle velocity being determined as a function of the calculated vehicle velocity and the buffered sensor measurements at each time stamp.

13. The method of claim 12 wherein buffering the sensor measurements includes buffering an acceleration of the vehicle at each time stamp.

14. The method of claim 13 wherein the acceleration includes a longitudinal acceleration, wherein the longitudinal acceleration is represented by the following formula:

$$a_{x,m} = \dot{v}_{x,estimate} - r_m \cdot v_{y,sensor} + a_{x,bias} + g \cdot \sin\theta_r + w_{ax,m},$$

where $a_{x,m}$ is the longitudinal acceleration, $\dot{v}_{x,estimate}$ is the longitudinal velocity derivative at the center of gravity of the vehicle, $r_m$ is a yaw rate at a sensor location, $a_{x,bias}$ is the longitudinal acceleration bias of the sensor, g is the gravity, $\theta$ is the road grade, and $w_{ax,m}$ is longitudinal accelerometer noise.

15. The method of claim 14 wherein a vehicle longitudinal velocity at a respective timestamp is represented by the following formula:

$$\hat{v}_x(t_{k+1}) = \hat{v}_x(t_k) + T_s \cdot (a_{x,m} + r_m \cdot \hat{v}_y(t_k) - g \cdot \sin\theta_r) \quad (15)$$

where $\hat{v}_x(t_{k+1})$ is the longitudinal velocity at timestamp k+1, $\hat{v}_x(t_k)$ is the longitudinal velocity at timestamp k, $T_s$ is the timestamp at a respective k, $r_m$ is the measured yaw rate, $a_{x,m}$ is the longitudinal velocity at the timestamp k, $\psi$ is the GPS heading angle, $\hat{v}_y(t_k)$ is the lateral velocity at timestamp k, G is the gravity, and $\theta$ is the road grade.

16. The method of claim 15 wherein a longitudinal vehicle velocity of a current timestamp is based on a synchronization of the measured GPS measurements and the sensor measurement data and is represented by the following formula:

$$\hat{v}_x(t) = \sum_{i=1}^{k} \hat{v}_x(t_i) + T_s \cdot (a_{x,i} + r_{m,i} \cdot \hat{v}_y(t_i) - g \cdot \sin\theta_{r,i})$$

where $\hat{v}_x(t)$ is the longitudinal velocity at time t, $\hat{v}_x(t_i)$ is the longitudinal velocity at each timestamp i, $T_s$ is the time at each timestamp i, $r_{m,i}$ is the measured yaw rate at time instant i, $a_{x,m}$ is the longitudinal acceleration at each timestamp i, $\psi$ is the GPS heading angle, $\hat{v}_y(t_i)$ is the lateral velocity at each timestamp i, g is the gravity, and $\theta$ is the road grade at each timestamp i.

17. The method of claim 13 wherein the acceleration measurements includes a lateral acceleration, wherein the lateral acceleration is represented by the following formula:

$$a_{y,m} = \dot{v}_{y,estimate} + r_{m,i} \cdot v_{x,sensor} + a_{y,bias} + g \cdot \sin\phi_r + w_{ay,m},$$

where $a_{y,m}$ is the lateral acceleration, $\dot{v}_{y,estimate}$ is the lateral velocity derivative at the center of gravity of the vehicle, $r_m$ is a yaw rate at a sensor location, $a_{y,bias}$ is the lateral acceleration bias of the sensor, g is the gravity, $\phi_r$ is the road grade, and $w_{ay,m}$ is lateral accelerometer noise.

18. The method of claim 17 wherein a vehicle lateral velocity at a respective timestamp is represented by the following formula:

$$\hat{v}_y(t_{k+1}) = \hat{v}_y(t_k) + T_s \cdot (a_{y,m} - r_m \cdot \hat{v}_x(t_k) - g \cdot \sin\phi_r)$$

where $\hat{v}_y(t_{k+1})$ is the lateral velocity at timestamp k+1, $\hat{v}_y(t_k)$ is the lateral velocity at timestamp k, $T_s$ is the timestamp at a respective k, $r_{m,i}$ is the measured yaw rate, $a_{y,m}$ is the lateral velocity at the timestamp k, $\psi$ is the GPS heading angle, $\hat{v}_x(t_k)$ is the longitudinal velocity at timestamp k, g is the gravity, and $\phi_r$ is the road grade.

19. The method of claim 18 wherein a lateral vehicle velocity of a current timestamp is based on a synchronization of the GPS measurements and sensor measurement data and is represented by the following formula:

$$\hat{v}_y(t) = \sum_{i=1}^{k} \hat{v}_y(t_i) + T_s \cdot (a_{y,i} - r_{m,i} \cdot \hat{v}_x(t_i) - g \cdot \sin\phi_{r,i})$$

where $\hat{v}_y(t)$ is the lateral velocity at time t, $\hat{v}_y(t_i)$) is the lateral velocity at each timestamp i, $T_s$ is the time at each timestamp i, $a_{y,m}$ is the lateral acceleration at each timestamp i, $r_{m,i}$ is the measured yaw rate at time instant i, $\hat{v}_x(t_i)$ is the longitudinal velocity at each timestamp i, g is the gravity, and $\phi_{r,i}$ is the road bank at each timestamp i.

20. A system for determining a vehicle velocity for a vehicle comprising:
   a single-antenna global positioning system (GPS) for providing an absolute speed and a course heading angle of the vehicle;
   vehicle sensors for providing yaw rate measurements independent of the GPS; and
   a processor for calculating an integrated yaw rate, a yaw angle a side slip angle, and a vehicle velocity;
   wherein integrated yaw rate of the vehicle is determined as a function of the measured yaw rates over a period of time, wherein the yaw angle is determined as a function of a re-initialized yaw angle and the integrated yaw rate, wherein the side slip angle is determined as a function of the determined yaw angle and the course angle provided by the GPS, wherein the vehicle velocity is determined as a function of the absolute speed and the side slip angle, and wherein the vehicle velocity is provided to a vehicle dynamic control application.

* * * * *